UNITED STATES PATENT OFFICE.

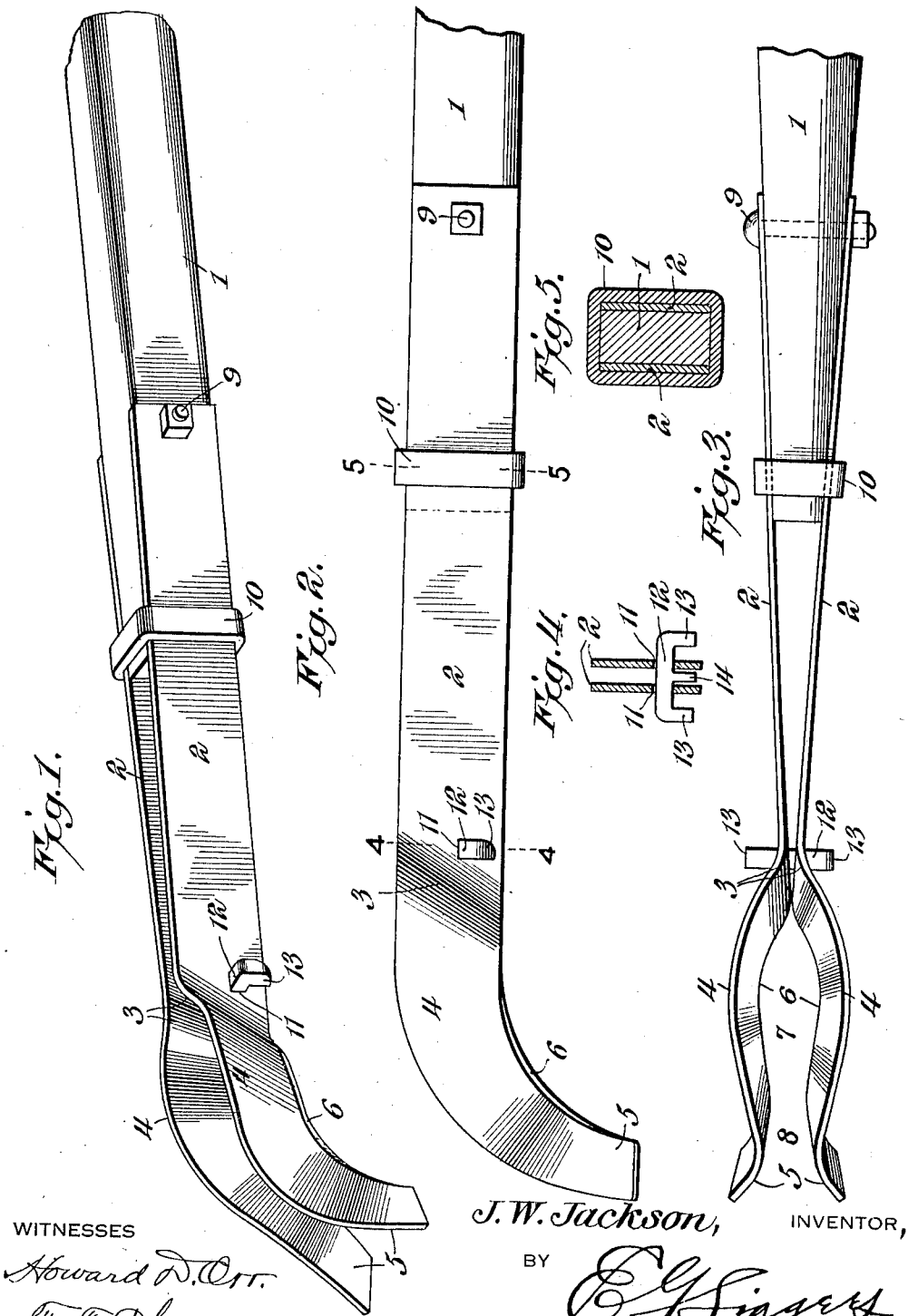

JOHN WESLEY JACKSON, OF PINEPARK, GEORGIA.

CANE-STRIPPER.

1,022,242. Specification of Letters Patent. Patented Apr. 2, 1912.

Application filed May 8, 1911. Serial No. 625,720.

*To all whom it may concern:*

Be it known that I, JOHN W. JACKSON, a citizen of the United States, residing at Pinepark, in the county of Grady and State of Georgia, have invented a new and useful Cane-Stripper, of which the following is a specification.

This invention has reference to improvements in cane strippers and its object is to provide an implement for this purpose which may be applied to the cane stalk at a point considerably higher than the head of the operator, while the handle is approximately parallel with the stalk and may then be carried along the stalk by a downward movement and at constantly changing angles, until the bottom of the stalk is reached, and then the stripper may be used for removing or raking the fodder or leaves from about the root end of the cane, so that the latter may be cut close to the ground.

In strippers as heretofore constructed difficulty is experienced in placing the stripper in operative relation to the cane at a high point thereon, but by the construction of the present invention this difficulty is overcome.

The stripper blades must be removed from time to time for repairs or sharpening and in the strippers heretofore constructed this is a tedious performance, and it is a further object of the present invention to provide a means whereby the stripper may be readily dismantled or assembled in whole or in part in a minimum of time. Furthermore, the blades are made elastic, so as to spring apart while having a normal tendency to approach, whereby the blades will always grip the stalk irrespective of the diameter of the latter, but the blades are provided by the present invention with a limiting means preventing too great a separation thereof, and this limiting means is so formed that it may be readily applied to the blades while separated from the handle, but cannot escape from the blades after they have been applied to the handle.

The invention will be best understood from a consideration of the following detailed description, taken in connection with the accompanying drawings forming a part of this specification, with the understanding, however, that while the device illustrated in the drawings is a practical embodiment of the invention, the construction shown is susceptible of changes and modifications while still retaining the salient features of the invention, and, therefore, the invention is not limited to the exact construction shown.

In the drawings:—Figure 1 is a perspective view of the improved cane stripper, the handle being broken away. Fig. 2 is a side elevation of the structure shown in Fig. 1. Fig. 3 is a top plan view of the cane stripper. Fig. 4 is a section on the line 4—4 of Fig. 2. Fig. 5 is a section on the line 5—5 of Fig. 2 with distant parts omitted.

Referring to the drawings, there is shown a cane stripper having a handle 1, customarily made of wood and of suitable length, which may be about three feet, although the particular length is not of importance. The side portions of the end of the handle shown are flattened and inclined one toward the other to receive blades 2, there being two such blades, each formed of a flat steel strip, which near the ends remote from the handle are first bent sharply away one from the other, as indicated at 3, then by a gentle curve, indicated at 4, are ultimately brought one toward the other, and finally again bent away one from the other as indicated at 5, the curved ends 3, 4 and 5 being in flaring relation one to the other, considering the direction of movement of the stripper along a cane stalk, from the bottom edges, indicated at 6, toward the top edges, the edges 6 being appropriately sharpened to cut the leaves or fodder readily from the stalks. The cutting edges define an opening 7 elongated in the direction of the length of the device and normally closed toward the handle, for the blades at the handle end of this opening are by their elasticity held in contact when free from the stalk, while the other end of the opening, that end remote from the handle, is quite open, forming an entrance or throat 8 with the extreme ends 5 of the blades curving away from this entrance, thus guiding the device readily on to a stalk with the opening 8 or entrance to the active portion of the blades of but little less diameter than the stalk when these blades are to be applied. Moreover, the portions 4 and 5 of the blades have a practically continuous curve in a downward direction, considering the blades as in the active position, so that when the stripper is held with the active end upward as when beginning the stripping operation, the flaring ends 5 will be presented almost at right angles to the length of the stalk, and hence will readily embrace the stalk and the device may be forced with little effort into encircling relation to the stalk, which will then be in the portion of the stripper defined by the curved parts 4 of the blades.

The blades 2 are held at their handle ends by a single bolt 9 passing through suitable perforations in the blades and through the corresponding portion of the handle 1 and the portions of the blades still in engagement with the handle but close to the forward end of the handle are held thereto by a collar 10 which may be beveled to conform to the beveled shape of the end of the handle and the approaching position of the blades, and when this collar is driven on to the end of the handle with the corresponding portions of the blades within it, these blades will be firmly held to the handle but may at any time be readily released by moving the collar in a direction away from the bolt 9, and then the blades may be removed from the handle by simply removing the bolt 9.

Each blade 2 near the curved portion 3 has formed therein a perforation 11, the perforation of one blade matching that of the other, and these perforations are traversed by a stop member 12. The perforations are preferably of square contour and the stop member 12 is preferably of square cross section, since it is desirable, though not mandatory, that this device be incapable of turning with relation to the blades 2. The stop member 12 has angle extensions 13 at the ends and an intermediate angle extension 14 projecting in any suitable direction from about the middle of the stop member 12 and designed to be lodged between the blades, while the end members 13 are exterior thereto and the distance between the end members 13 determines the extent of separation of the active ends of the blades when in encircling relation to a cane stalk. The stop member 12 prevents undue movement of the blades one away from the other under any conditions, which movement might result under some conditions in the distortion or breakage of the blades.

Because of the angle ends 13 and intermediate angle portion 14 of the stop member 12 this member can never become dislodged so long as the blades are fast to the handle 1, but the relation of the perforations 11 to one edge of each blade is such that the stop member may be readily introduced first into one blade and then into the other before the blades are fastened to the handle, but can be neither introduced through nor removed from the blades when the latter are secured to the handle.

When the stripper is to be used, the operator grasps the handle and raises the active end of the stripper to the desired height and by approaching the flaring ends 5 to the cane the stripper is readily applied to the cane, the amount of force needed to separate the blades the short distance necessary to permit the entrance of the stalk into the space defined by the members 4 being too small to cause any material bending of the cane stalk. The stripper is now brought downward along the cane stalk at varying angles until it ultimately reaches the bottom of the stalk, the blades yielding as needed because of their elasticity, but never more than permitted by the stop member 12. The curved or hawkbill end of the stripper blades may be carried down close to the ground with the stripper at an angle of forty-five degrees more or less to the cane when the downwardly curved ends 5 may be utilized for the raking out of the leaves or blades from about the roots, so that the cane can be cut close to the ground.

The stripper may be used without any necessity whatsoever of overhead work, that is, without any necessity of the operator lifting the hands high in order to apply the stripper blades to the cane and to draw them down the cane stalk with the handle held approximately at right angles thereto during the whole operation.

What is claimed is:—

1. A cane stripper provided with mating blades in approaching relation and having active ends curving first away one from the other, then toward each other as they recede from the handle, and finally again away from each other, the blades also curving in the portions included in the second and third named curvatures in the direction of the active stroke of the stripper.

2. A cane stripper provided with mating blades in approaching relation and having active ends curving first away one from the other, then toward each other as they recede from the handle, and finally again away from each other, the blades also curving in the portions included in the second and third named curvatures in the direction of the active stroke of the stripper, the curved portions of the blades flaring throughout one from the other in a direction opposite to that of the direction of the operative stroke.

3. A cane stripper having opposing blades with the active cane engaging portions curved in the direction of the active stroke of the stripper, and also curved first away from each other, and then toward each other as well as in the direction of the active stroke of the stripper.

4. A cane stripper provided with elastic blades in approaching relation toward the active ends and at said active ends flaring one from the other in a direction the reverse of the active stroke of the stripper, said active ends of the blades first receding and then approaching, and finally again receding to the ends of the blades, and curving substantially throughout the active portion in the direction of the active stroke of the blades.

5. A cane stripper provided with hawk-bill blades having a normal approaching tendency and yieldable to a force tending to separate the blades, and a stop member in traversing relation to the blades and having terminal angle extensions for engaging and arresting the movement of the blades one from the other, said stop member being also provided with an intermediate angle extension projecting therefrom in the same direction as the end angle extensions and lodged between the blades.

6. A cane stripper provided with hawk-bill blades having a normal approaching tendency and yieldable to a force tending to separate the blades, and a stop member in traversing relation to the blades and having terminal angle extensions for engaging and arresting the movement of the blades one from the other, said stop member being also provided with an intermediate angle extension projecting therefrom in the same direction as the end angle extensions and lodged between the blades, the stop member being of non-circular contour and the blades being provided with passages for the stop member of like contour.

7. A cane stripper comprising a suitable handle, flat blades carried by the handle and approaching from their handle ends toward the active ends and there first curved one away from the other and then one toward the other, and finally one away from the other, and also having a general curvature in the direction of the active stroke of the stripper, and the active ends of the blades also flaring one from the other in a direction opposite the direction of the active stroke of the stripper, and a stop member in traversing relation to the blades adjacent their point of closest normal approach, said stop member having angle ends and an intermediate angle extension projecting in the same direction as the ends, the ends being exterior to the blades and the intermediate angle extension being lodged between the blades.

In testimony, that I claim the foregoing as my own, I have hereto affixed my signature in the presence of two witnesses.

JOHN WESLEY JACKSON.

Witnesses:
W. L. PENDERGAST,
M. G. McMANUS.

---

Copies of this patent may be obtained for five cents each, by addressing the "Commissioner of Patents, Washington, D. C."